(12) United States Patent
Kunkel et al.

(10) Patent No.: US 6,860,650 B2
(45) Date of Patent: Mar. 1, 2005

(54) ASSEMBLY FOR ALIGNING AN OPTICAL ARRAY WITH OPTICAL FIBERS

(75) Inventors: Ronald Kunkel, Jim Falls, WI (US); David Barneson, Eleva, WI (US); Jane E. Novacek, Eau Claire, WI (US); Steven C. Nelson, Fall Creek, WI (US); Randy W. Wickman, Cadott, WI (US); Jagdish T. Madhav, Morton Grove, IL (US)

(73) Assignee: Corona Optical Systems, Inc., Lombard, IL (US)

( * ) Notice: Subject to any disclaimer, the term of this patent is extended or adjusted under 35 U.S.C. 154(b) by 375 days.

(21) Appl. No.: 10/211,732

(22) Filed: Aug. 2, 2002

(65) Prior Publication Data

US 2003/0031431 A1 Feb. 13, 2003

Related U.S. Application Data

(60) Provisional application No. 60/310,660, filed on Aug. 7, 2001.

(51) Int. Cl.[7] ............................ G02B 6/00; G02B 6/36; G02B 6/42; G02B 6/43; G02B 6/34
(52) U.S. Cl. ......................................... 385/92; 359/566
(58) Field of Search .............................. 385/14, 31, 34, 385/37, 39, 49, 52, 88–92; 359/566; 357/79, 99; 438/26, 115

(56) References Cited

U.S. PATENT DOCUMENTS

| 6,056,448 | A | | 5/2000 | Sauter et al. |
|---|---|---|---|---|
| 6,318,909 | B1 | | 11/2001 | Giboney et al. |
| 6,547,454 | B2 | * | 4/2003 | Wickman et al. ............. 385/88 |
| 6,724,015 | B2 | * | 4/2004 | Nelson et al. ................ 257/99 |
| 2002/0034363 | A1 | * | 3/2002 | Wickman et al. ............. 385/88 |
| 2003/0067029 | A1 | * | 4/2003 | Zheng ........................ 257/309 |
| 2003/0128925 | A1 | * | 7/2003 | Wickman .................... 385/37 |
| 2003/0147600 | A1 | * | 8/2003 | Wickman et al. ............. 385/88 |

* cited by examiner

Primary Examiner—Akm Enayet Ullah
(74) Attorney, Agent, or Firm—Welsh & Katz, Ltd.

(57) ABSTRACT

An electro-optical converter assembly is described. The electro-optic converter includes an optically transparent substrate with a plurality of alignment apertures and an optical device disposed on a first planar surface of the optically transparent substrate in alignment with the plurality of alignment apertures so that an axis of transmission of the optical device passes directly through the optically transparent substrate.

17 Claims, 9 Drawing Sheets

ASSEMBLY FOR ALIGNING AN OPTICAL ARRAY WITH OPTICAL FIBERS

This application claims the benefit of Provisional Application No. 60/310,660, filed Aug. 7, 2001.

FIELD OF THE INVENTION

The field of the invention relates to communication systems and more particularly to methods of making electro-optical connections on circuit boards.

BACKGROUND OF THE INVENTION

Optical connections to circuit boards in the past have typically been limited to a single optical fiber at a time. Such connections have typically involved the use of a optical transmitter or detector placed within a cylindrical metal enclosure with a transparent top (i.e., a "TO can") and soldered to a circuit board.

Since TO cans do not inherently have provisions for cable attachment, an annular cable supporting structure is typically attached to the circuit board that also supports the TO can. Typically, the annular structure is placed over the TO can with a central hole of the structure disposed over the transparent top of the TO can to bring the optical fiber of the waveguide into alignment with the optical device within the TO can. To secure the waveguide to the board, a female thread on the waveguide engages a male thread disposed around the hole in the annular structure.

While the use of waveguides with TO cans has been successful, it is also difficult to use and time consuming to assemble. Often the optical device within the TO can is not precisely aligned with the outside of the TO can. As a consequence, alignment is typically achieved by trial and error. Often the optical device is activated and the waveguide is moved around a predetermined path over the TO can to identify the location of greatest signal transfer. The supporting structure may then be secured to the circuit board in that location.

Where many connectors are required, the cost of assembly becomes prohibitive. Accordingly, a need exists for a reliable method of creating detachable optical connections that does not rely upon feedback signal detection methods.

SUMMARY

An electro-optical converter assembly is described. The electro-optic converter includes an optically transparent substrate with a plurality of alignment apertures and an optical device disposed on a first planar surface of the optically transparent substrate in alignment with the plurality of alignment apertures so that an axis of transmission of the optical device passes directly through the optically transparent substrate.

DETAILED DESCRIPTION OF AN ILLUSTRATED EMBODIMENT

Figure 1:
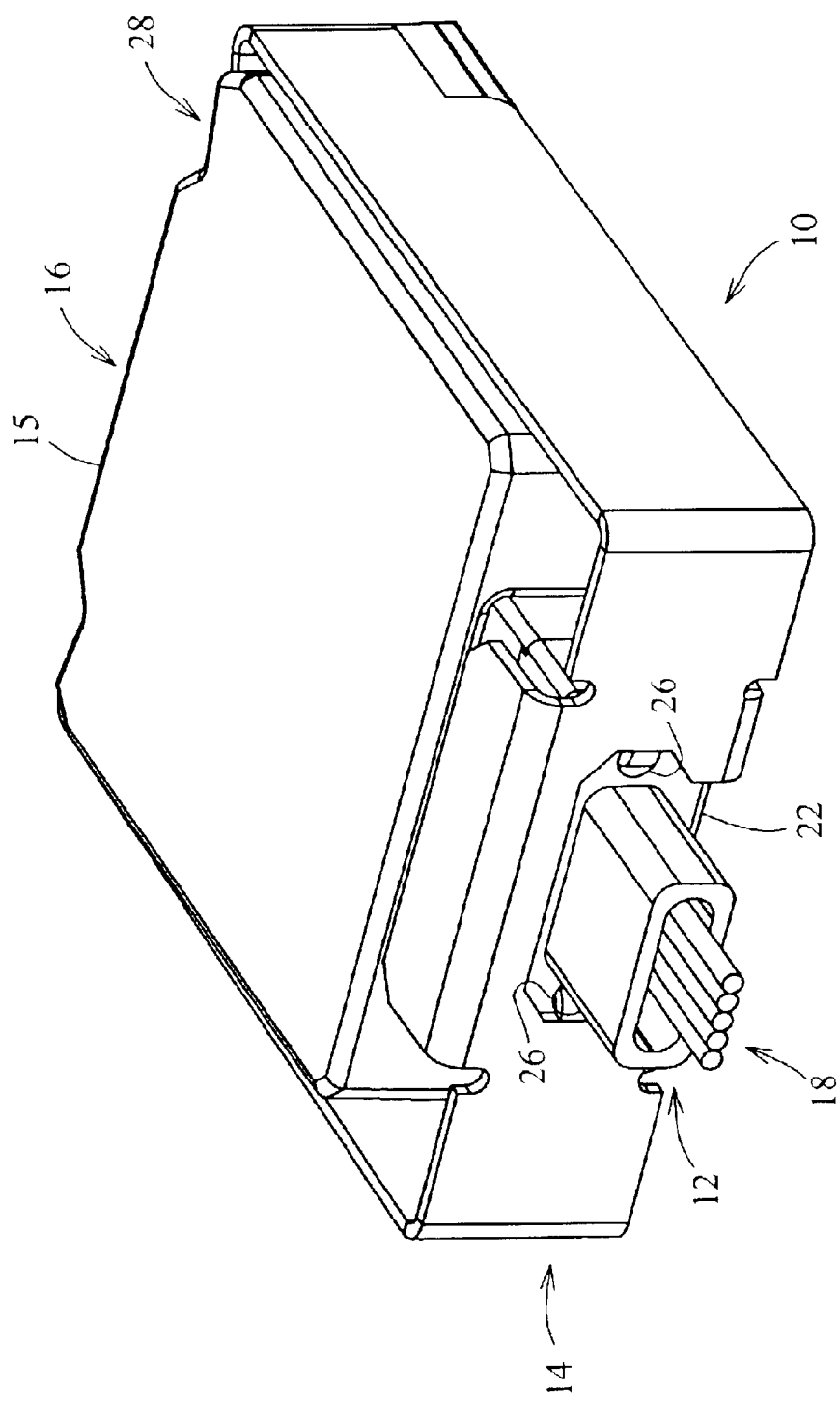
FIG. 1 depicts an electro-optical converter assembly in accordance with an illustrated embodiment of the invention.

FIG. 1 depicts an electro-optical converter assembly 10, shown generally in accordance with an illustrated embodiment of the invention. The optical assembly 10 may be used where ever an optical interface is required between optical fibers and signal processing circuit boards.

The electro-optic converter assembly 10 may generally include a plug assembly 12, a converter module 16, and an attachment clip 14. The plug assembly 12 may include a number of optical fibers 18, terminating in an appropriate connector (e.g., an MT connector) 22. Although the figure shows five optical fibers 18 within the connector 22, the number of fibers 18 is not limited in any way.

Figure 2:
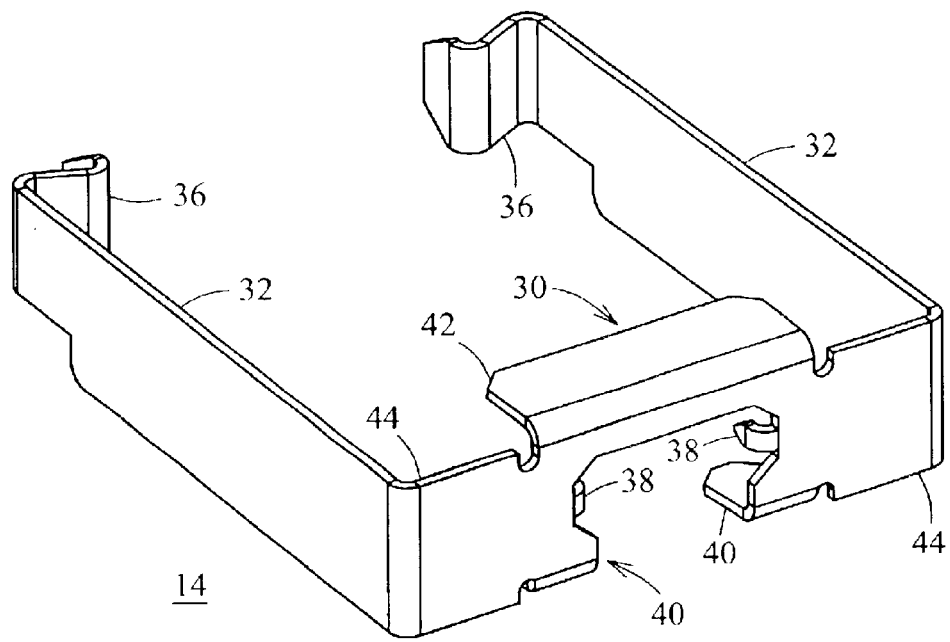
FIG. 2 depicts a clip used with the assembly of FIG. 1.

The attachment clip 14 may be provided as a separate structure intended to resiliently secure the connector 22 to the converter module 16. The attachment clip 14 (FIG. 2) may include a central yoke 30, a pair of arms 32 extending from opposing ends of the yoke 30 and a pair of hooks 36 disposed on a distal end of the arms 32.

A pair of pegs 38 may be disposed around a periphery of the aperture that surrounds the connector 22 and may extend outwardly towards the module 16. The pegs 38 may engage a set of apertures 26 in the connector 22 and function to retard lateral motion of the clip 14 with respect to the connector 22.

Similarly, an upper guide 42 and lower set of guides 40 function to align the yoke 30 in a vertical direction. In general, the pegs 38 and guides 40, 42 function to stabilize the location of the yoke 30 with respect to the connector 22.

A cantilevered member 44 on either end of the yoke 30 resiliently bends to allow the hooks 36 to be extended to engage an opposing end of the converter module 16. A complementary notch 28 on opposing sides of the converter module 16 is provided to receive and retain the hooks 36.

Figure 3:
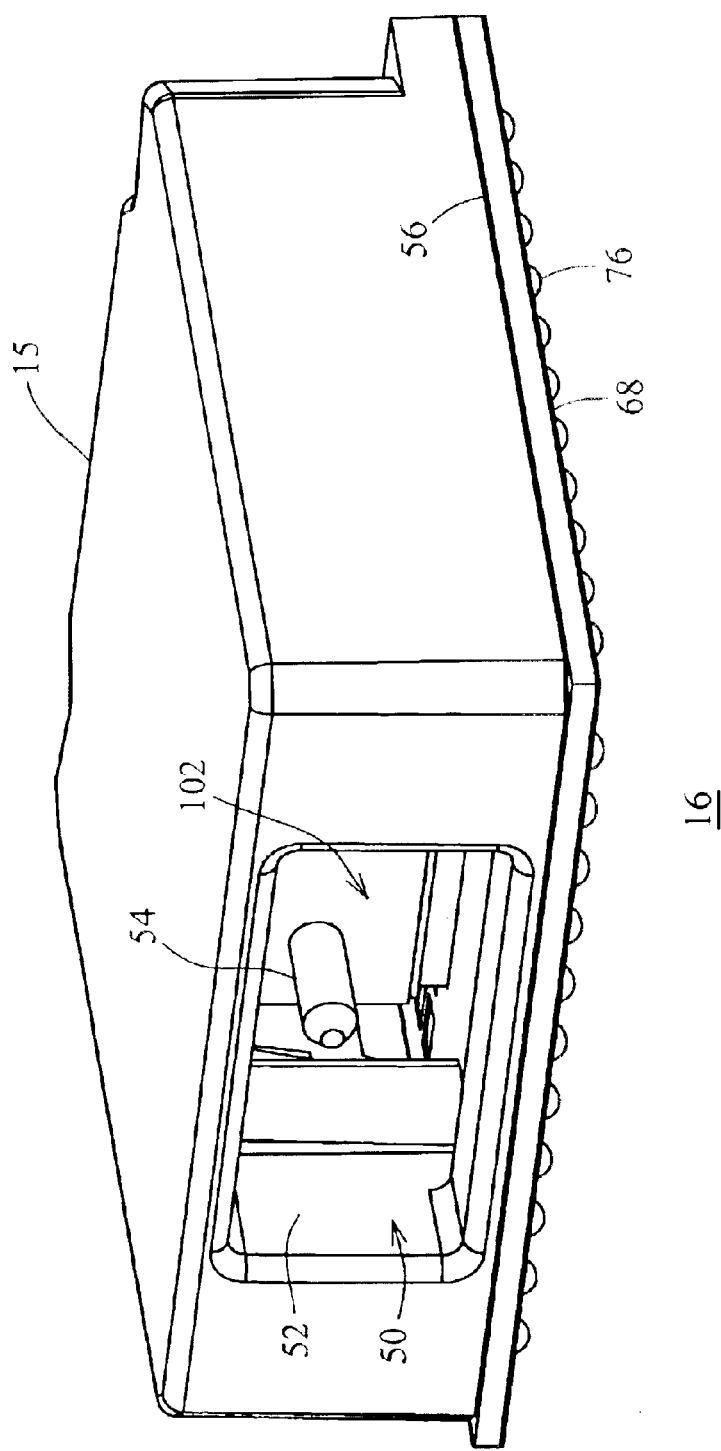
FIG. 3 depicts the assembly of FIG. 1 without an external connector or clip.

FIG. 3 depicts the converter module 16 with the clip 14 and plug 12 removed. Included within the module 16 is a tapered guide aperture 50 with tapering sides 52 that function to provide a preliminary alignment mechanism to bring the plug 12 into coarse alignment with a set of optical converters within the converter module 16.

Figure 4:
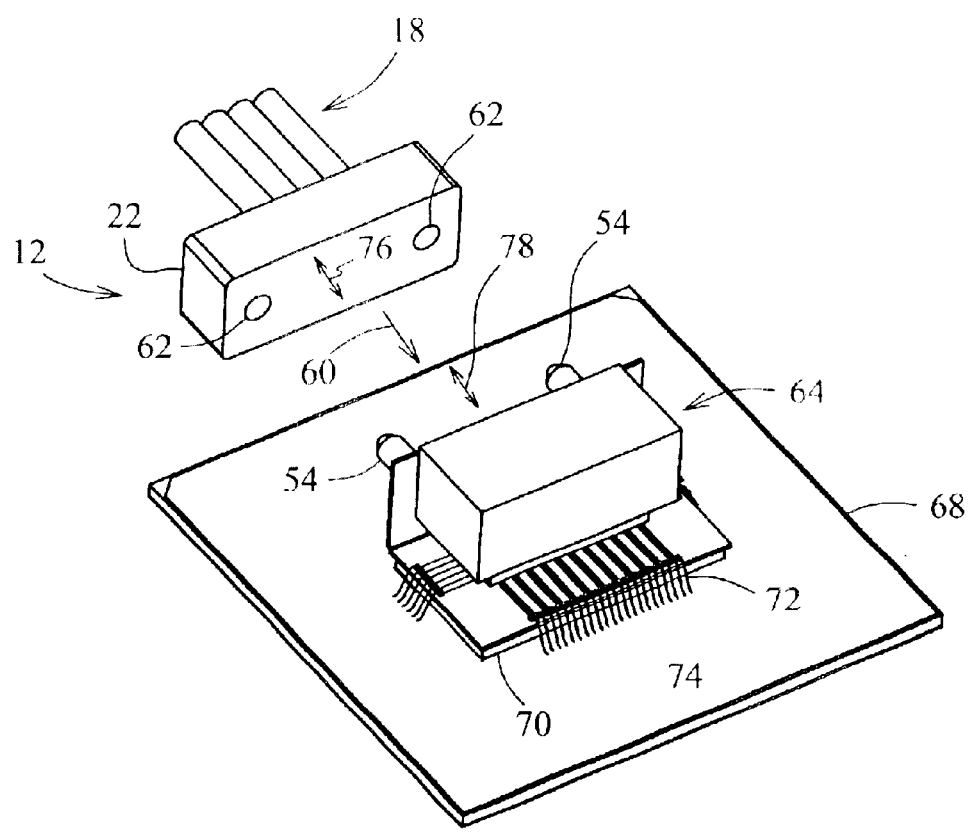
FIG. 4 depicts the assembly of FIG. 1 with the cover removed.

FIG. 4 is a rear perspective view of the converter module 16 with the cover 15 of FIG. 1 removed. A partial view of the connector 22 is depicted showing the direction 60 from which the connector 22 would engage the converter module 16. As shown, once the tapered guide 50 brings the plug 12 into coarse alignment with the optical converters 102, a first set of guides (e.g., guide pins 54) of a converter assembly 64 engage a second, complementary set of guides (e.g., alignment apertures 62) within the plug 12 to bring an axis of transmission 76 of the optical fibers 18–20 into final alignment with an axis of transmission 78 of the optical converters 102 of the converter assembly 64.

Figure 5:
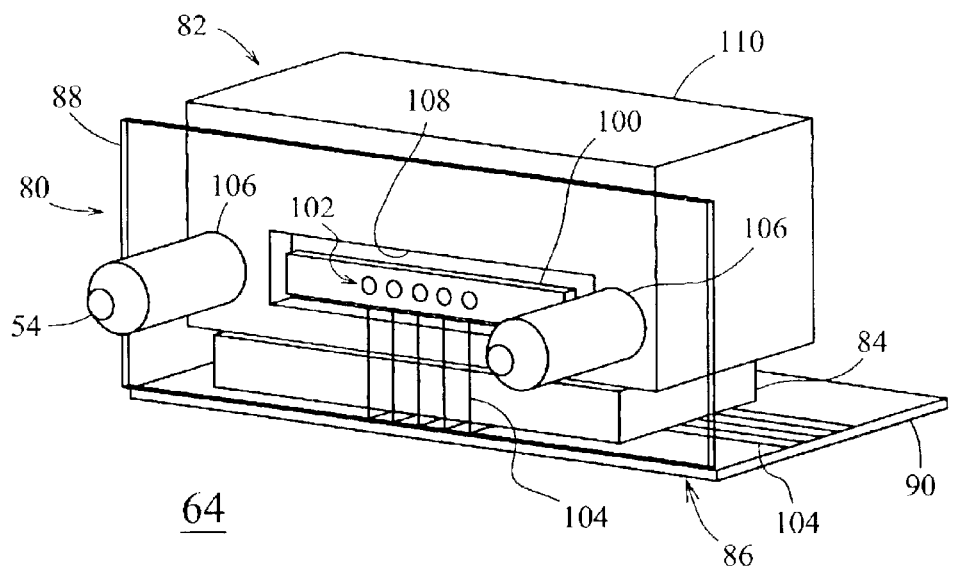
FIG. 5 depicts a view of an converter assembly used with the electro-optical converter of FIG. 1.

FIG. 5 depicts a front perspective view of the converter assembly 64. As shown, the converter module 64, includes a substrate assembly 80, guide pins 54 and a pin holder assembly 82. The substrate assembly 80 generally includes a first, optically transparent substrate 88 and second substrate 90 connected to the first substrate 88 by a hinge 86.

Figure 6:
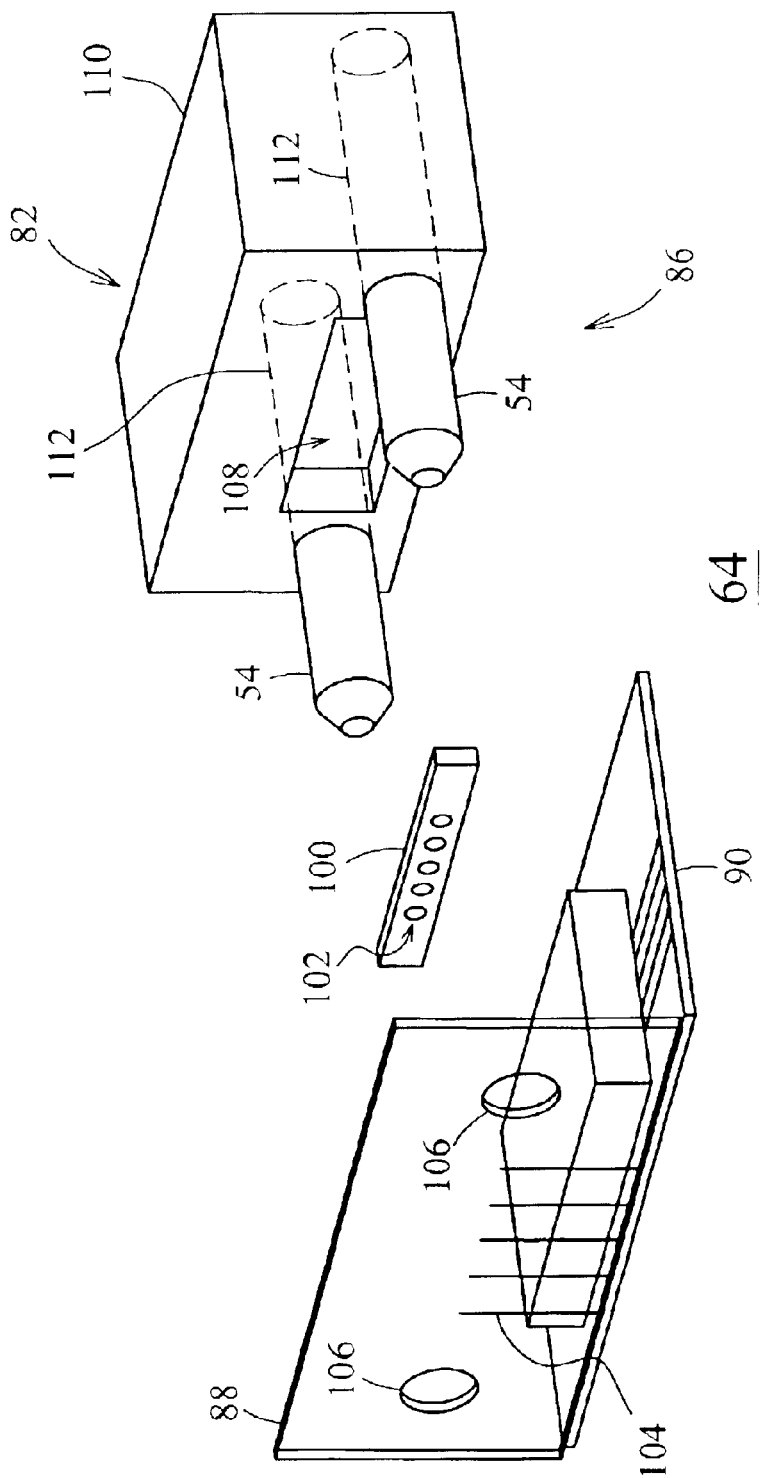
FIG. 6 depicts an exploded view of the converter assembly shown in FIG. 5.

As shown in FIG. 5, the optically transparent substrate 88 includes an optical (photonics) converter (e.g., an optical array) 100 mounted on a backside of the first substrate 88 between the first substrate 88 and the pin holder assembly 82. The optical array 100 is visible in FIG. 5 by looking through the transparent substrate 88. FIG. 6 shows an exploded view of FIG. 5, and does not necessarily represent the order of assembly or assembly process, as will described in further detail below.

As shown in FIGS. 1, 3–5, the substrate 88 is disposed between the optical converters 102 and the ends of the optical fibers 18 of the plug 12. Optical energy of the signals exchanged between the converters 102 and fibers 18 are transmitted directly through the substrate. As used herein, an optical signal that passes directly through the substrate 88 means that it passes through the material that forms the substrate 88. It does not mean that it passes through a hole in the substrate 88.

The optical array 100 may be a conventional (e.g., a VCSEL) array of transmitting devices 102 or may be any of a number of any other optical devices (e.g., an array of PIN diodes, an array that includes a mixtures of optical emitters and optical detectors, etc.) 102. In general, an axis of transmission of each optical device 102 of the array 100 passes directly through the substrate 88 regardless of whether the direction is into or out of the device 102.

The second substrate 90 may include a signal processing device 84. The signal processing device 84 may process signals to/from the optically active devices 102. In the case where the devices are diode lasers, then the signal processing device 84 may function as a signal demultiplexer that demultiplexes signals from other external signal sources (not shown) and as a driver that drives a respective diode laser 102 with the demultipexed signal. In the case where the array 100 includes optical detectors 102, then the signal processing device 84 may function as a signal amplifier and multiplexer that multiplexes signals from a respective detector 102 for use by other external devices (not shown).

The hinge 86 may be comprised of a number of metallic traces 104 that form conductors that connect the signal processor 84 with the optical array 100. The traces in FIG. 5 are seen looking through the substrate 88, and are thus disposed on a first surface of substrate. The hinge 86 may be reinforced with a layer of polyimide that connects the first substrate 88 to the second substrate 90 and that extends the length of the hinge 86.

In general, the substrate assembly 80 may be fabricated from a single slab of optically transparent material (e.g., a slab of glass). The conductive traces 104 may be disposed on the first side of the slab using a suitable technology (e.g., photolithography). Next, the material may be scored along the hinge area on a second side of the slab using an appropriate scoring technology (e.g., diamond blade cutting saw, laser ablation, etc.). The score may be provided substantially through the thickness of the material (e.g., about 75% through). If the material is scored through the entire thickness, this could damage or break the conductive traces 104.

Next, the array 100 and signal processor 84 may be connected to the traces 104 of the substrate 80. Connection may be accomplished by a suitable connection method (e.g., wave soldering, stud bumping, etc.).

A set of guide pin apertures 106 may be created in the slab by laser ablation. The apertures 106 may be located on a common centerline passing through each of the devices 102 and at a predetermined distance from either side of the array 100. Alignment of the laser for ablating the apertures 106 may be accomplished automatically using an image recognition system programmed to recognize the optically active ports of the devices 102 of the array 100 looking through the transparent substrate 88.

It should be noted in this regard that the use of a transparent substrate 88 allows the guide pin apertures 106 (and guide pins 54) to be precisely aligned (i.e., within 5 microns) with the optical converter devices 102. Alignment of the guide pin apertures 106 to the devices 102, a priori, also results in a precise alignment of the plug 12 and fiber 18 to the devices 102 without the use of trial and error alignment procedures.

Once the guide pin apertures 106 have been created, a strip of polyimide may then be laid down on the second side of the assembly 80 directly over the slot on the opposing side. The slab may then be fractured along the slot.

Figure 7:
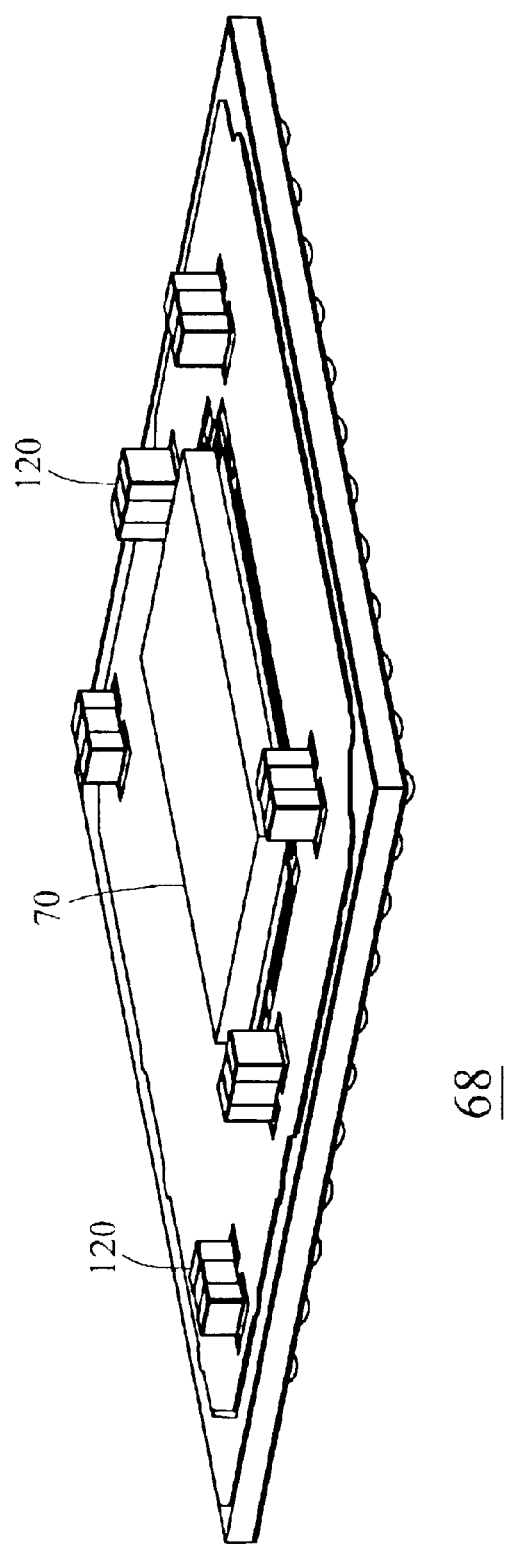
FIG. 7 depicts a fan-out substrate that may be used with the electro-optic converter assembly of FIG. 1.

The pins 54 may then be assembled to (e.g., pressed into pre-drilled holes 112 within) the pin holder block 110 (FIG. 7) and the pin holder assembly 82 may be assembled to the substrate assembly 80. It may be noted in this regard that the pin holder block 110 may be provided with a recess 108 to receive the array 100 while the adjoining surface of the pin holder assembly 82 on that same side contacts the substrate 88 around the array 100.

To assemble the pin holder assembly 82 to the substrate assembly 80, the rear surface of the array 100 may be partially coated with an electrically insulative, thermally conductive glue. The pins 54 of the pin holder assembly 80 may be placed into the apertures 106 and advanced through the apertures 106 until a back surface 112 of the recess 108 engages the array 100 and glue disposed on the rear surface of the array 100.

Next, the top surface of the signal processing device 84 may also be partially coated with the electrically insulative, thermally conductive glue. Up until this step the first and second substrates 88, 90 may have remained in the same plane. Once the glue is applied to the top of the signal processor 84, the pin holder assembly 82 and first substrate 88 is rotated upwards around the hinge 86 until a bottom (right angle) surface of the pin assembly 82 bottoms out against the glue on the top surface of the signal processor 84. Once the bottom surface of the pin holder assembly 82 bottoms out against the top of the signal processor 84, the first substrate 88 assumes a substantially right-angle relationship with the second substrate 90 as shown in FIGS. 5 and 6 for reasons which will be explained below.

The converter assembly 64 may then be assembled to a fan-out substrate 68 (FIG. 7) with a ceramic spacer 70 interposed between the converter assembly 64 and fan-out substrate 70. The converter assembly 64 may be secured to spacer 70 and the spacer 70 secured to the fan-out substrate 68 using a suitable electrically insulative, thermally conductive adhesive.

Electrical connections between the fan-out substrate 68 and converter assembly 64 may be accomplished by wire bonding. As shown in FIG. 4 a number of wire bonds 72 may be used to connect the traces 104 disposed on the converter assembly 64 with the fan-out connection points 74 of the substrate 68.

The fan-out substrate 68 may include a number of passive circuit elements (e.g., resistors, capacitors, etc.), 122 to match the impedance of the assembly 10 to external circuits (not shown). An array of connection structures (e.g., stud bumps) 76 may be used to interconnect the assembly 10 to the external circuits.

Figure 8:
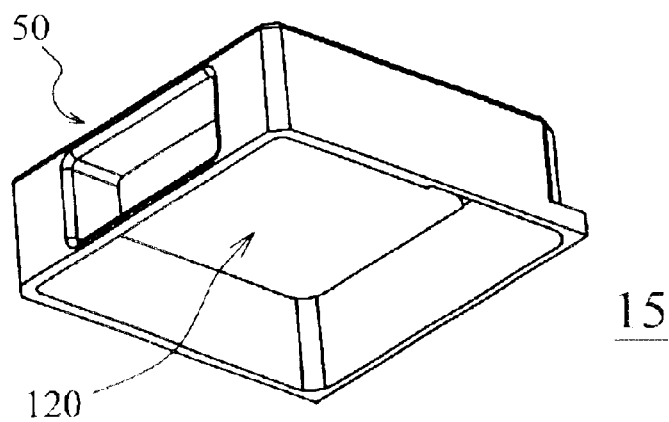
FIG. 8 depicts a bottom, perspective view of the cover of FIG. 1.
Figure 9B:
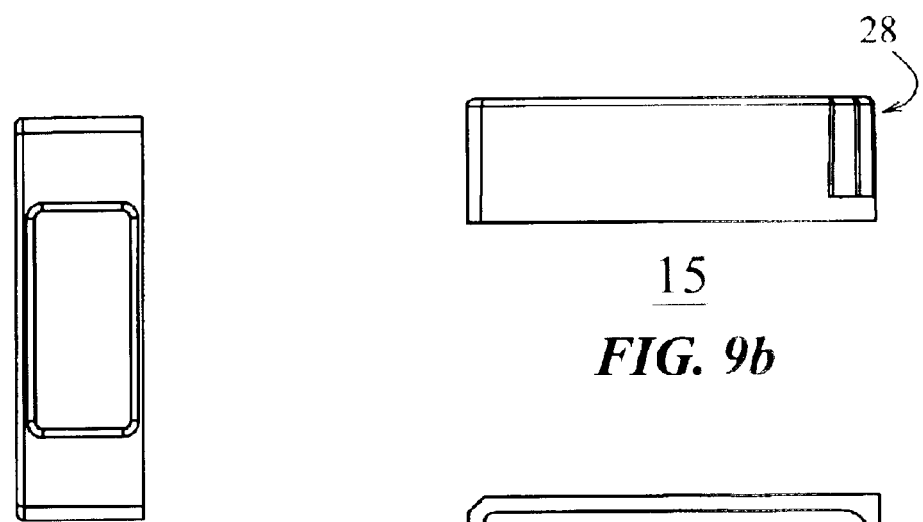
FIG. 9 depicts top, side and front view of the cover of FIG. 1.
Figure 9C:
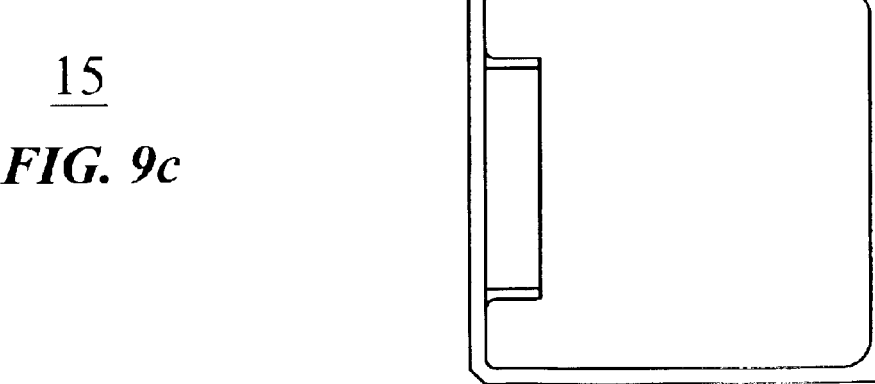
Figure 9A:
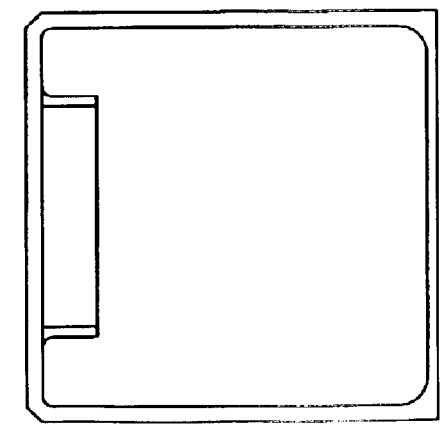

FIG. 8 shows a bottom, perspective view of the cover 15. FIGS. 9a–c show bottom, side and end views of the cover 15. The cover 15 may be fabricated of any heat conductive material (e.g., aluminum, copper, etc.).

As shown in FIGS. 8 and 9, the cover 15 includes an inside recess 120 for receiving the converter assembly 64. The recess may be formed (e.g., milled) into the cover 15 with tapering sides (and depth) so as to receive and guide the pin block 110 into a position where the pins 54 are centered directly in front of the tapered guide aperture 50. Further, the spacer 70 (discussed above) may be provided, not only to electrically isolate the converter assembly 64 from the fan-out substrate 68, but also of sufficient thickness to ensure that the top of the pin holder assembly 82 is in full thermal contact with a top surface of the recess 120.

To assemble the cover 15 to the converter 64 and substrate 68, the top of the pin holder block 10 may be partially coated with a thermally conductive coating and the cover 15 may be placed over the pin holder assembly 82. As the cover 15 is placed over the converter 64, the cover 15 may pressed down to bottom out against the pin holder assembly 82. To complete the assembly 10, a bead of sealant 56 (shown in FIG. 3) may be placed between the cover 15 and the fan-out substrate 68.

Figure 10:
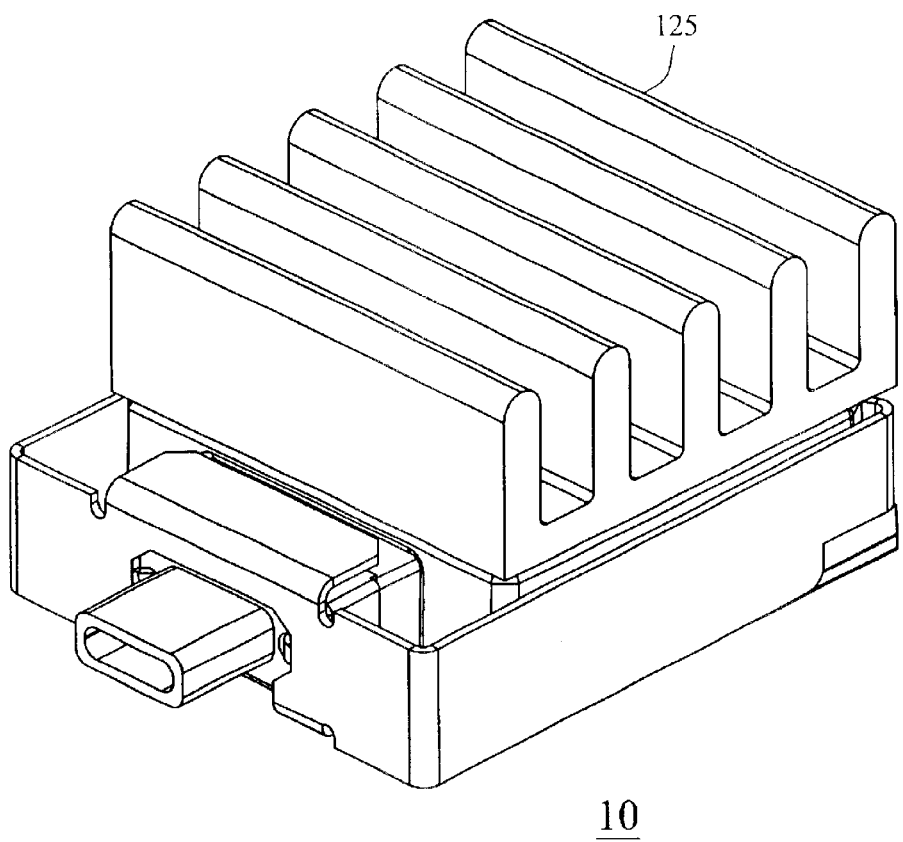
FIG. 10 depicts a cover with a heat sink that may be used with the electro-optic converter assembly of FIG. 1.

To further improve the thermal performance of the optical assembly 10, additional cooling may be added to the assembly 10. For example, a finned heat sink 125 may be glued or otherwise attached to an outside surface of the cover 15, as shown in FIG. 10.

The assembly 10 has been found to be rugged and to perform reliably under a number of different operating conditions. The right angle relationship between the first substrate 88 and second substrate 90 allows the connector 12 to be inserted in a direction parallel to an underlying printed circuit board (PCB). This has been found to be important where other circuit boards may lie in close proximity.

Further, the attachment of the first and second substrates 88, 90 to the pin holder assembly and, in turn to the fan-out substrate 68 results in a converter structure that is extremely tolerant to twisting and to the lateral forces associated with the insertion and removal of the plug 12. The addition of the cover 15 serves to further strengthen and reinforce the already rugged structure provided by the pin holder assembly 82.

Further, the placement of the substrates 88, 90 on adjacent facets of the pin holder assembly 82 allows for relative short lead lengths between the signal processor 84 and the optical array 100 (approximately 2 mm). Short lead lengths contribute to reduced noise and improved speed of performance.

In addition, the thermal continuity between the array 100, pin holder assembly 82 and cover 15 and between the signal processor 84, pin holder assembly 82 and the cover 15 allow for a very compact assembly (e.g., approximately 15 mm on a side by less than 2 mm high) that adapts well to adverse operating environments. The compactness of the converter assembly 10 facilitates the use of the assembly 10 in applications such as cross-connect terabit routers or metropolitan dense wavelength division multiplexing systems.

A specific embodiment of an optical converter has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. An electro-optical converter assembly for transferring an optical signal between an electro-optical converter device and a waveguide, such converter assembly comprising:

an optically transparent substrate with a plurality of alignment apertures, the electro-optical converter device disposed on a first side of the optically transparent substrate in alignment with but offset from the plurality of alignment apertures so that an axis of transmission of the optical device passes directly through the optically transparent substrate; and a pin holder disposed on the first side of the optically transparent substrate, said pin holder further comprising a plurality of apertures adapted to receive a first end of each of the plurality of guide pins, said pin holder being further disposed against a rear surface of the electro-optical converter device to absorb and dissipate heat produced by the optical device.

2. The electro-optical assembly as in claim 1 further comprising an alignment pin disposed in a respective aperture of each of the plurality of alignment apertures.

3. The electro-optical assembly as in claim 1 further comprising a second substrate connected to the first substrate at substantially a right angle to the first substrate.

4. The electro-optical assembly as in claim 3 further comprising a signal processor disposed on the second substrate in thermal contact with the pin holder.

5. The electro-optical assembly as in claim 4 further comprising a plurality of metal traces disposed across a first surface of the second substrate and the first surface of the first substrate, said traces functioning as conductors that connect the signal processor to the electro-optic converter device.

6. The electro-optical assembly as in claim 5 wherein the metal traces further comprise a hinge connecting the optically transparent substrate to the second substrate.

7. The electro-optical assembly as in claim 6 further comprising a fan-out substrate coupled to the second substrate.

8. The electro-optical assembly as in claim 7 further comprising a cover in thermal contact with the pin holder assembly and forming a heat dissipation path for the electro-optical converter and signal processor.

9. The electro-optical assembly as in claim 8 further comprising a finned heat sink disposed on the cover.

10. The electro-optical assembly as in claim 9 further comprising an optical plug that engages a second end of each of the plurality of alignment pins so as to align a waveguide of the plug with the transmission axis of the electro-optical converter device.

11. The electro-optical assembly as in claim 7 further comprising an optical assembly cover adapted to enclose the substrate and optical device, said optical assembly cover further comprising an aperture along an edge surface adapted to receive the optical plug and provide a progressive alignment of the plug with the plurality of alignment pins as the plug is inserted into the optical assembly cover.

12. The electro-optical assembly as in claim 11 further comprising an attachment clip securing the waveguide of the plug in alignment with the electro-optical converter device.

13. The electro-optical assembly as in claim 12 wherein the clip further comprises a yoke that engages a rear of the plug.

14. The electro-optical assembly as in claim 13 wherein the clip further comprises a pair of arms with hooks, said hooks engaging a pair of complementary notches on a rear surface of the cover.

15. The electro-optical assembly as in claim 14 wherein the clip further comprises a pair of cantilevered members extending from opposing sides of the yoke and that resiliently connect with the arms.

16. The electro-optical assembly as in claim 1 wherein the electro-optic converter device further comprises a vertical cavity surface emitting laser.

17. The electro-optical assembly as in claim 1 wherein the electro-optic converter device further comprises a PIN diode.

* * * * *